Oct. 20, 1925.
E. A. BARRE ET AL
1,557,791
DUST SHUTTER FOR CAMERAS IN AIRPLANES
Filed June 9, 1923
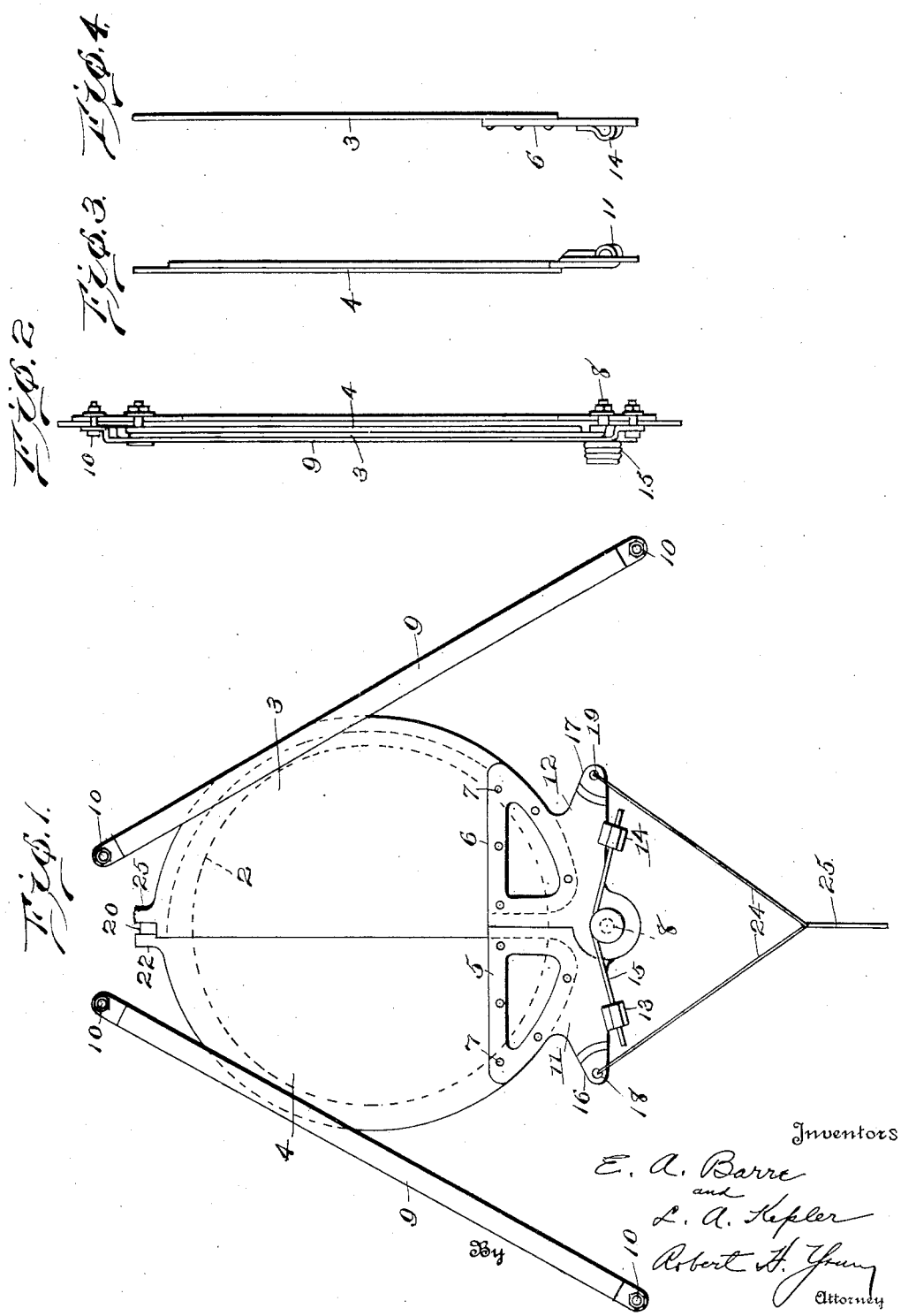

Patented Oct. 20, 1925.

1,557,791

UNITED STATES PATENT OFFICE.

ELMATE A. BARRE AND LAWRENCE A. KEPLER, OF DAYTON, OHIO.

DUST SHUTTER FOR CAMERAS IN AIRPLANES.

Application filed June 9, 1923. Serial No. 644,468.

*To all whom it may concern:*

Be it known that we, ELMATE A. BARRE and LAWRENCE A. KEPLER, citizens of the United States, residing at Dayton, in the county of Montgomery and State of Ohio, have invented certain new and useful Improvements in Dust Shutters for Cameras in Airplanes, of which the following is a specification.

This invention relates in general to dust shutters for cameras and more particularly to dust shutters for cameras used in aircraft.

Airplane cameras are, as a rule, mounted within the fuselage of the airplane with the lens portion of the camera directly over and very slightly above an opening cut into the floor of the fuselage. These cameras are usually quite heavy and are mounted in operative position before the plane leaves the ground. On the take-off of the plane the blast of air from the propellers blows a stream of particles of dust, mud, stones, and the like back along the bottom of the fuselage with the result that many of such particles enter the opening in the fuselage and are deposited on the lens of the camera with the result that the pictures which are subsequently taken are partially, if not completely, spoiled.

It is an object of my invention to provide a dust shutter or door adapted to cover the opening in the fuselage and prevent the ingress of dust and the like, the shutter being adapted to be readily opened by the photographer after the take-off.

Other objects of my invention will appear in the accompanying specifications and claims and will be disclosed in the drawings in which Fig. 1 is a bottom plan view of my device as applied to an airplane.

Fig. 2 is a side elevation of the same.

Fig. 3 is a side elevation of one of the shutters.

Fig. 4 is a side elevation of the other shutter.

Referring with greater particularity to the drawings it will be seen that my device is comprised as follows:

A circular opening 2 is cut in the floor of the airplane fuselage 1. The semi-circular shutters 3 and 4 are secured to suitable brackets 5 and 6 by means of rivets 7. Brackets 5 and 6 are pivotally mounted on the bottom of the fuselage by means of bolt 8. Suitable guides 9 are secured by bolts 10 placed, as shown particularly in Fig. 1, in such a manner as to support the end of the shutters opposite their pivot ends and adapted to form guideways for the shutters as they are opened and closed.

Brackets 5 and 6 are provided with suitable arm portions 11 and 12 on which are mounted spring guides 13 and 14 for guiding the ends of the coiled spring 15 mounted on the bolt 8 and tending to hold the shutters normally closed. At the ends 16 and 17 of the arms 11 and 12 there are provided apertures 18 and 19 in which cables 24 are secured. Cables 24 are connected as shown to a single cable 25 which extends over suitable pulleys (not shown) to a point within the fuselage readily accessible to the photographer.

The shutters 3 and 4 have extensions 22 and 25 adapted to abut against the stop stud 20. It will be noted that the two brackets abut each other in the closed position of the shutters while the shutters overlap each other and completely exclude the ingress of dirt or dust.

The operation of my device is as follows:

The spring 15 tends to keep the shutters normally closed and when in this position the shutters exclude dust. When it is desired to take pictures the photographer pulls on the cable 25 thereby opening the shutters which slide back in the guides 9. When the cable 25 is released the spring forces the shutters back into their closed position.

We claim:

1. A device for protecting the lens of a camera mounted in an airplane fuselage, comprising a pair of cooperating shutters, means for pivoting the shutters for movement toward and away from each other, spring means for holding the shutters closed, and a flexible pull cable connected to each shutter, a pull on which opens the shutters against the tension of the spring means.

2. A device for protecting the lens of a camera mounted in an airplane fuselage, comprising a pair of cooperating shutters, pivot means for mounting the shutters for movement toward and away from each other, spring means for holding the shutters closed, carried on said pivot means, and means for opening the shutters against the spring means.

3. A device for protecting the lens of a camera mounted in an airplane fuselage, comprising a pair of cooperating shutters, pivot means for mounting the shutters for movement toward and away from each other, spring means for holding the shutters closed, carried on said pivot means, and a flexible pull cable for opening the shutters against the spring means.

4. A device for protecting the lens of a camera mounted in an airplane fuselage, comprising a pair of shutters, brackets for carrying the shutters, guides for the shutters, a common pivot for the brackets, and means for opening and closing the shutters.

5. A device for protecting the lens of a camera mounted in an airplane fuselage, comprising a pair of shutters, guides for the shutters, brackets for carrying the shutters, the brackets having abutting edges, common pivot means for the brackets, and spring means mounted on the pivot for holding the shutters closed.

6. A device for protecting the lens of a camera mounted in an airplane fuselage, comprising a pair of shutters, brackets for carrying the shutters, an outwardly extending arm carried by each bracket, a common pivot for the brackets, spring means mounted on the pivot for holding the shutters closed, and cable means attached to the outwardly extending arms for opening the shutters.

7. In combination with an airplane fuselage having an opening for the lens of a camera in the bottom thereof, a pair of shutters mounted adjacent the opening for movement in a horizontal plane, guide means for allowing the opening and closing of the shutters and for preventing any inward movement thereof, and means for opening and closing the shutters.

8. In combination with an airplane fuselage having an opening for the lens of a camera in the bottom thereof, a pair of shutters movable in a horizontal plane for closing the opening, a common pivot for the shutters at one side of the opening, and guide means for allowing the opening and closing of the shutters and for preventing any inward movement thereof, and means for opening and closing the shutters.

In testimony whereof we affix our signatures.

ELMATE A. BARRE.
LAWRENCE A. KEPLER.